US008612243B2

(12) United States Patent
McGill et al.

(10) Patent No.: US 8,612,243 B2
(45) Date of Patent: *Dec. 17, 2013

(54) SYSTEM AND METHOD OF MANAGING COMMUNITY-BASED AND CONTENT-BASED INFORMATION NETWORKS

(75) Inventors: Robert E. McGill, Rumson, NJ (US); Clifford F. Boyle, Hingham, MA (US); Jamie Mazur, S. Glastonbury, CT (US); Jason Mazur, Waltham, MA (US); Alex Gerus, Dnepropetrovsk (UA); Eugene Berkov, Dnepropetrovsk (UA); Kunal Bhomick, Webster, NY (US)

(73) Assignee: Shazzle LLC, Braintree, MA (US)

( * ) Notice: Subject to any disclaimer, the term of this patent is extended or adjusted under 35 U.S.C. 154(b) by 280 days.

This patent is subject to a terminal disclaimer.

(21) Appl. No.: 13/160,856

(22) Filed: Jun. 15, 2011

(65) Prior Publication Data
US 2012/0158733 A1 Jun. 21, 2012

Related U.S. Application Data

(63) Continuation of application No. 12/176,747, filed on Jul. 21, 2008, now Pat. No. 7,983,927.

(60) Provisional application No. 60/952,927, filed on Jul. 31, 2007, provisional application No. 60/953,112, filed on Jul. 31, 2007.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
USPC .......................................... 705/1.1; 705/319

(58) Field of Classification Search
None
See application file for complete search history.

(56) References Cited

U.S. PATENT DOCUMENTS

| 5,721,910 | A | 2/1998 | Unger et al. |
| 6,151,684 | A | 11/2000 | Alexander et al. |
| 6,208,993 | B1 | 3/2001 | Shadmon |
| 6,801,909 | B2 | 10/2004 | Delgado et al. |

(Continued)

OTHER PUBLICATIONS

International Search Report Application No. PCT/US 08/70629 mailed Dec. 12, 2008.

*Primary Examiner* — Jonathan Ouellette
(74) *Attorney, Agent, or Firm* — J.A. Lindeman & Co., PLLC

(57) ABSTRACT

A system for storing, managing, and accessing information on a network by providing an interface between a social network and a content network includes an applications platform. The system provides messaging and social networking facility incorporating enhanced instant messaging, file synchronization, network presence, interactive chat capabilities, text messaging, voice and video messaging, blogging, and email. The system includes a viewer, an indexing facility, and a storage facility. The viewer enables users to traverse content and provides services based upon context of time, place, structure, node, and observed user behavior. The viewer provides a means for users to interact with information on the network and services to manipulate information and transact activities. The indexing facility manages the structure of the network and tracks attributes and controlled vocabularies. The indexing facility supports navigation across the structure and resolves the logical index to a physical storage location. The storage facility provides physical persistence for an information component.

33 Claims, 7 Drawing Sheets

(56) References Cited

U.S. PATENT DOCUMENTS

| | | |
|---|---|---|
| 6,954,760 B2 | 10/2005 | Yamashita |
| 6,980,984 B1 | 12/2005 | Huffman et al. |
| 6,985,906 B2 | 1/2006 | Yamashita |
| 7,031,961 B2 | 4/2006 | Pitkow et al. |
| 7,089,237 B2 | 8/2006 | Turnbull et al. |
| 2002/0016786 A1 | 2/2002 | Pitkow et al. |
| 2002/0052873 A1 | 5/2002 | Delgado et al. |
| 2003/0135488 A1 | 7/2003 | Amir et al. |
| 2003/0229884 A1 | 12/2003 | Carr et al. |
| 2004/0002995 A1 | 1/2004 | Martino et al. |
| 2004/0186738 A1 | 9/2004 | Reisman |
| 2005/0177805 A1 | 8/2005 | Lynch et al. |
| 2005/0222981 A1 | 10/2005 | Lawrence et al. |
| 2006/0026147 A1 | 2/2006 | Cone et al. |

SYSTEM AND METHOD OF MANAGING COMMUNITY-BASED AND CONTENT-BASED INFORMATION NETWORKS

CROSS-REFERENCE TO RELATED APPLICATIONS

This application is a continuation application of U.S. patent application Ser. No. 12/176,747 filed on Jul. 21, 2008. This application claims the benefit of priority to application Ser. No. 12/176,747 and to U.S. Provisional Patent Application Ser. No. 60/952,927 filed on Jul. 31, 2007, and to U.S. Provisional Patent Application Ser. No. 60/953,112 also filed on Jul. 31, 2007. These applications are incorporated by reference in their entirety.

TECHNICAL FIELD

Embodiments of the present invention relate generally to network management. More particularly, embodiments of the present invention relate to managing community based and content based information networks and incorporating the two into a seamless computer environment.

BACKGROUND

Community (social) and content based information networks are known. Community based networks are made up of a set of individuals or organizations with a common interest or interdependency and tend to offer a combination of a social dimension and a real-time communication ability. The individuals may share values, ideas, financial information, friendship, relatives, interests, and trade. Content based networks are made up of the materials (e.g., files and metadata) that support such interests and tend to offer organization of information into categories and subcategories in a network fashion.

SUMMARY

According to an aspect of the invention, a computer-implemented method of managing an information network is provided by an interface between a social network and a content network. The method includes creating a community of users; defining an interaction record structure; storing an interaction record in the community of users based upon the interaction record structure; creating a community index of the interaction record; tagging the interaction record; synchronizing the community of users based upon the community index by providing the stored interaction record to users such that the users have the same interaction record; and updating the community index.

The method of the present invention may further include individual users requesting membership in the community of users and accepting or rejecting the requests for membership based on criteria established by the community of users. The method may also include displaying presence information characterizing an individual user based on a community of users viewed by the characterized individual user as well as characterizing an individual user in the community of users based upon the interaction record that the individual user is viewing.

The method of the present invention may include a community index characterized by a version number, and synchronization of the community of users may include acquiring the interaction record at the direction of a peer user based upon the version number of the community index. Further, the interaction record may be acquired by retrieving the community index for a user joining the community of users, and the community index may be updated for a user that previously joined the community of users. The peer user may be a community keeper that locates a community user who has a current version of the community index.

Additionally, in acquiring the interaction record, the method may further include selecting the community user, sending a delivery request to the selected community user for the interaction record, comparing the delivery request to the community index of the selected community user, comparing the delivery request to the interaction record of the selected community user, and receiving the interaction record from the selected community user when the delivery request matches the community index of the selected community user and the delivery request matches the interaction record of the selected community user.

In acquiring the interaction record, the system and method of the present invention may synchronize the community index by selecting the community user, sending a delivery request to the selected community user for the current version of the community index, comparing the delivery request to the community index of the selected community user, and receiving the current version of the community index from the selected community user if the delivery request matches the community index of the selected community user. Additionally, the synchronization of the interaction record may further include sending a delivery request to the selected community user for a current version of the interaction record, comparing the delivery request to the version of the interaction record of the selected community user, and receiving the current version of the interaction record from the selected community user if the delivery request matches the interaction record of the selected community user.

The method and system of the present invention may also save the interaction record with a local filename, save the interaction record as a source version record with a version number designation, verify the viability of the saved interaction record with the local filename, and remove the source version record when the saved interaction record is viable, or overwrite the saved interaction record with the source version record when the saved interaction record is not viable.

In tagging the interaction record, the method and system of the present invention may label the interaction record with a first classification scheme and rate the first classification scheme. The first classification scheme may also include a tag set definition. Further, the labeling of the interaction record may also include sending a message to a user based upon the label of the interaction record. Additionally, the interaction record may be labeled with a second classification scheme, the second classification scheme may be rated, and a community classification scheme may be determined based upon the rating of the first classification scheme and the rating of the second classification scheme. An inventory of tag set definitions may be used from which a user may choose to classify the interaction record.

Additionally, when storing the interaction record in the community of users, the system and method of the present invention may create a smart folder, where the smart folder houses the interaction record with at least one tag set definition, and the interaction record and the tag set definition may be indexed. Further, the interaction record to be housed in the smart folder may be made to conform to a predetermined tag set definition to impose structure upon the interaction record before it is added to the community. The interaction record may be rated to establish a user-rated value of content in the interaction record.

Also, using the system and method of the present invention, the user may be rated within the community of users based upon an aggregate rating of interaction records that the user rated, and then that user-rated value of content in the interaction record may be weighed based upon the rating of the user within the community of users. A direct community rating may be performed, where an individual user rates the community of users in which the individual user participates. A collective member score of the community of users may be determined, where the collective member score includes a sum of the ratings of the individual users in the community of users. An average resource rating may be determined, where the average resource rating includes an average rating of interaction records within the community of users, and the community of users may be rated based upon the direct community rating, the collective member score, and the average resource rating.

The system and method of the present invention may further determine the community keeper by a keeper failover process, where the keeper failover process includes detecting failure of a user in the information network and electing a best-fit successor node to the failed user from a dynamic group of available users, where the dynamic group of available users includes all active nodes in the information network and where the best-fit successor node assumes the role of the community keeper and coordinates operations including community membership, presence, and content distribution. Electing the best-fit successor node may include delivering presence information and a community index to users in the information network, receiving a keeper failure message, validating that the community keeper is inaccessible, noting the community keeper position is vacant, holding existing users within the information network and preventing additional users from accessing the information network until the best-fit successor node is elected, broadcasting the keeper failure message to users in the information network, halting current activity on the information network, acknowledging the keeper failure message and providing a state of the acknowledging user, where the acknowledgment includes the acknowledging user's current index version, uptime statistics, and topology, scoring the acknowledging users with a fitness heuristic to evaluate the users' readiness to assume the role of keeper based on their reported state, selecting the best-fit successor node based upon the scores of the acknowledging users, and sending a keeper handoff request to the selected best-fit successor node. The selected best-fit successor node may send a keeper handoff accept message to the users on the information network, and the identity of the best-fit successor node as the keeper may be broadcast on the information network.

The data stored in the information network may be evaluated using the computer-implemented method of the present invention. The method includes creating a hierarchical view of the tabular data, creating a flat list view of the tabular data, combining the hierarchical view of the tabular data and the flat list view of the tabular data to create a resource grid, and determining on-demand at run time a boundary between the hierarchical view of the tabular data and the flat list view of the tabular data. The tabular data may include a tag index characterizing the tabular data, and the tag index may be filtered to traverse the resource grid to locate a data record from within the combined hierarchical view and the flat list view. Tabular Data that can be viewed using the multidimensional resource grid includes any "tags" assigned to an index entry (interaction record). As shown below with the example of a "Baseball Player," a tag set describing the classification criteria for a baseball player (position, average, team, etc) is attached to a "smart folder". This assures that all index entries placed in that smart folder are classified using this defined scheme. As a result, the logical data in that folder can be thought of as having a tabular structure where the "column headers" are the tag names and the "rows" are the index entries. This tabular view can be manipulated as discussed below into a hybrid hierarchical/flat view.

These and other features, advantages, and aspects of the present invention will become more apparent from the following detailed description of embodiments and implementations of the present invention when viewed and considered in conjunction with the accompanying drawings. The present invention is also capable of other embodiments and different embodiments, and details can be modified in various respects without departing from the spirit and scope of the present invention. Accordingly, the drawings and descriptions below are to be regarded as illustrative in nature, and not as restrictive.

BRIEF DESCRIPTION OF THE DRAWINGS

The accompanying drawings illustrate an embodiment of the invention and depict the above-mentioned and other features of this invention and the manner of attaining them. In the drawings.

DETAILED DESCRIPTION OF THE INVENTION

Figure 1:
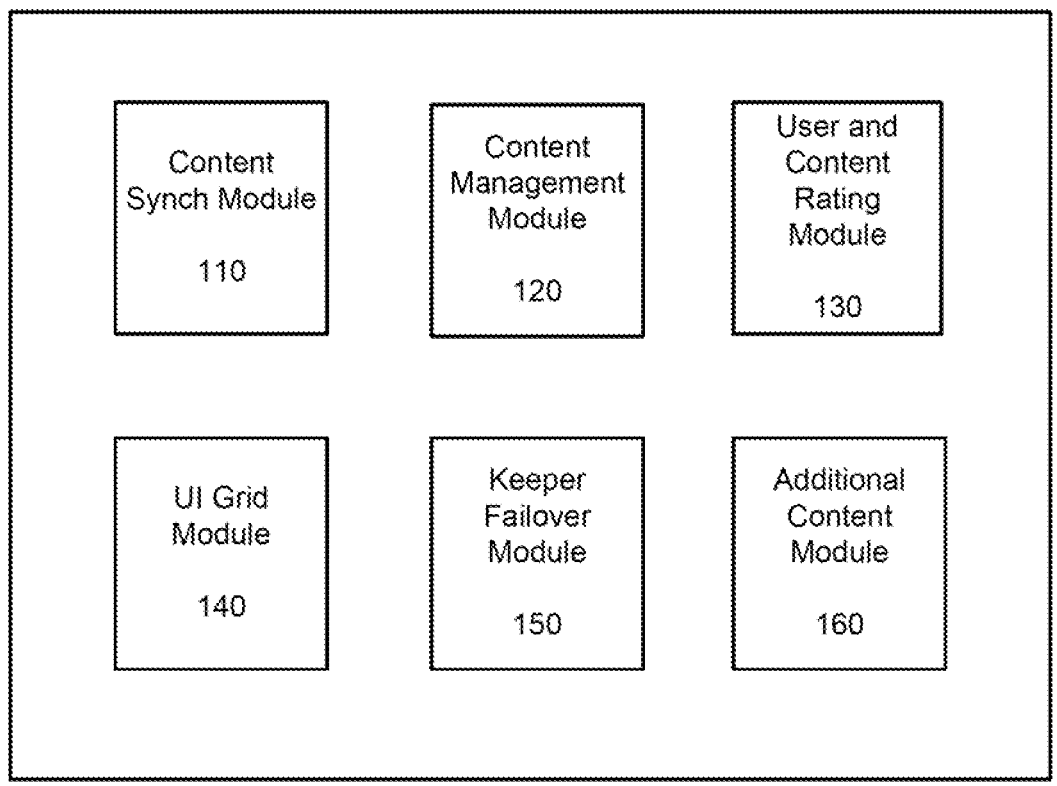
FIG. 1 illustrates modules of a system according to an embodiment of the present invention.

The following detailed description of the invention refers to the accompanying drawings and to certain preferred embodiments, but the detailed description does not limit the invention. The scope of the invention is defined by the appended claims and equivalents as it will be apparent to those of skill in the art that various features, variations, and modifications can be included or excluded based upon the requirements of a particular use.

Reference will now be made in detail to embodiments of the present invention, examples of which are illustrated in the accompanying drawings, where like reference numerals refer to the like elements throughout. The embodiments are described below to explain the present invention by referring to the figures.

As used in this application, the terms "a", "an" and "the" may refer to one or more than one of an item. The terms "and" and "or" may be used in the conjunctive or disjunctive sense and will generally be understood to be equivalent to "and/or". For brevity and clarity, a particular quantity of an item may be described or shown while the actual quantity of the item may differ.

As illustrated in the discussion below, the present invention manages community based and content based information networks that may incorporate a combination of a social dimension and real-time communication ability of a social network with the organization of information into categories and subcategories in a network fashion of a content network. To do this, embodiments may employ an innovative seamless integration of features required to interact with a community over the Internet. As used herein, a community may be defined as "Social Network," including a dynamic set of individuals with a common interest or as a "Content Network," including the materials, such as files and metadata, and the like, that support this interest.

In use, a user may click on a listed community and may see other users who are affiliated with content in that community. This capability does not currently exist on any Internet application. Also, embodiments of the present invention may identify who is looking at what content, with what tags, and may provide that user with relevant information for social interaction, relevant information to navigate the network and community, and relevant information for targeting content. Embodiments of the present invention may also provide a potential advertiser with relevant interests of the user (based on the content currently or previously visited).

Embodiments of the present invention may define a single point of entry, a single user interface, and a unified set of protocols to provide communication and content management capabilities of a community.

Communities, in accordance with embodiments of the present invention, may permit members to communicate, both individually and as whole. Thus, a user within a community may be able to view a list of members who are also currently "active" in the community. The user may communicate with these active members via community-wide chat, or by one-to-one instant messaging, or by other similar communications methods.

Communities in accordance with embodiments of the present invention may require government and may provide for freedom of affiliation. To achieve this, the community owner(s) may define rules to gate entry into the community. Once a user has entered the community, they may be assigned roles, which may determine the behaviors that they are allowed to perform. Going forward, the community has a list of "members" who are users with a permanent relationship with the community, along with these roles.

Communities in accordance with embodiments of the present invention may provide well-organized access to related content. To realize this, the communities may contain a set of "resources" including content such as documents, images, and URLs that are relevant to members of the community. These resources may be contributed to and/or accessed by any user with the appropriate role, such as an appropriate permission level, access control, and the like, within the community.

In accordance with embodiments of the present invention, community content may be organized by a well-understood, domain-appropriate vocabulary. To do this, communities may organize content in "smart folders". These folders may allow the users to organize content using a consistent set of tags and tag values. By enforcing tag rules, smart folders allow content to be better categorized, discovered, and compared.

Communities in accordance with embodiments of the present invention may maintain an index of content which is propagated to each community member. Thus, all content within a community may be managed through a community-wide index. This index may manage information regarding the content itself including its actual physical location, as well as tag and tag values associated with this content. This index may be automatically propagated to each community member.

Communities in accordance with embodiments of the present invention may allow for specific content items to be copied to a community member's local persistent storage. By optionally providing a local copy of content, access to content is maintained even when an Internet connection is not present. An embodiment of the present invention provides tools to select content that may be copied to a local persistent storage, as well as tools to manage the overall disk space required by this local storage.

Communities in accordance with embodiments of the present invention may self govern through setting their own rules regarding content and user ratings. Stated another way, communities may govern access and authority through application of standards represented by user ratings. Communities may also provide editorial standards through application of content ratings.

Referring to FIG. 1, there are illustrated modules 110, 120, 130, 140, 150, 160 of a system 100 by which the present embodiment may be realized.

The system 100 may include a content synchronization module 110; a community based content management module 120; an integrated user and content rating system module 130; a multidimensional user interface (UI) resource grid module 140; a keeper failover Mechanism module 150; and an additional content based on tags module 160. Each module is described in detail in turn below.

Content Synchronization Mechanism Module 110

The system 100 of the present embodiment may incorporate a peer-to-peer network without a fixed central authority. To do so, the system 100 may provide modules and methods that allow users to register interest in a basket of content (known as a "community") and then receive automatic updates for this content at any location where the user accesses the system 100 of the present embodiment. The process to establish this synchronization is based on an overall community version number as well as individual version numbers for each discrete content component or module.

The system 100 of the present embodiment creates the stability of a server-based configuration in a peer-to-peer network allowing for the interface of a social network with a content network. The system 100 manages information in a community construct (community) across a peer-to-peer network.

Each community may have a community keeper which maintains a master index of information in that community. Each peer that is a member of the community may also maintain a copy (in memory or in another suitable storage device) of this index. The community keeper may not be fixed to an individual device; rather, the community keeper may "float" from device to device to maintain index services to that community in the event the community keeper device shuts down (orderly float) or crashes (disorderly float).

The system 100 may successfully handle non-guaranteed message delivery situations, which are situations where updates sent to the community keeper or from the community keeper are not guaranteed to be delivered, and the index update algorithms needed to maintain peer and keeper indices cannot assume successful message delivery. In one embodiment, the system 100 may employ a PEER/KEEPER Index Synchronization Algorithm to maintain a robust, consistent index in a p2p architecture. This algorithm is built to solve issues surrounding keeping index updates consistent without a constant and central keeper of information, such as a server, for example.

The following definitions facilitate a more efficient explanation of various aspects of the system, modules, and methods of the present invention:

1. Tag—a content classification scheme or method. A non-limiting example of a tag would be the attribute "Color".
2. Tag Value—an instance of a tag such as a word or number associated with content. A non-limiting example of a tag value for the "Color" tag would be "Blue".
3. Tag Set—a group of tags that together may form a logical description of content in the context of a community. A non-limiting example of a tag set would be "Color", "Size", and "Style". This tag set would have meaning within the context of a community focused on clothing.
4. Tag Sequence—the order of tags that a user may traverse when searching or browsing content. A non-limiting example of a tag sequence would be 1. Style; 2. Size; 3. Color.
5. Default Tag Sequence—the initial tag sequence used to organize content. The default tag sequence may be determined when a smart folder is created. It may be modified by a user to alter the manner in which that user wishes to locate content.
6. Tag Level—the level in the tag sequence that may be currently active or may be displayed. A non-limiting example tag level for the tag "Color" in the tag sequence example above would be 3.
7. Content—a discrete component of information. Content may have many different forms such as spreadsheets, word processing documents, bitmaps, data objects, documents, or other items.
8. Smart Folder—an organizational unit or grouping of content that may enforce tagging rules and consistency.
9. Community—a group of users who may belong to an community with a common interest or focus. Communities may include the following properties:
Membership list
Set of Active and Inactive Users
Index of Content
Individual Content Items
Member Roles
Membership Rules
Location or Locations in the Hierarchy of Communities
Peer Identified as the Current Community Keeper.
10. Community Keeper—the node that may be the central management console for a community. It may float from one node to another if the current node goes off-line or becomes unavailable for any reason.
11. node—an instance of the software running on one computer.
12. user—an authenticated user on the system. Multiple users may use a node, but, in an embodiment, not at the same time.
13. Dictionary—Tag sets are published to a Dictionary, which is a central repository of tag sets that may be used by Community Creators when establishing smart folders. Once tag sets are published here, they may not be changeable.

The content synchronization mechanisms of the content synchronization mechanism module 110 of the present embodiment may determine what versions exist for a particular piece of content and determine the latest version of the content. For content to be useful on a peer-to-peer network, this content synchronization mechanism ensures accurate version control, including updating indices of the content for the users. A community keeper may provide the functionality required. The community keeper may exist on a central server, or may be designated as one of the community participants or network nodes.

When a user establishes communication with the community keeper node of the present embodiment, the community version number on the user's node is checked and compared to the current version number of the community master copy (known as the community keeper). If the user's local version is less than the Community Keeper version, then those content changes that have taken place in between the two versions are determined.

The community keeper then may locate other community members who have a current version of the community and have the content components that are needed by the user. These community members then may pass the content needed to upgrade the user to the current version. When this content has been shared with the user, the community keeper may then upgrade its records with the current version number for this user. By having the updates, performed by other community members in a peer-to-peer fashion, the system may distribute the load across many points in the network and allows multiple nodes to stream new content to the user at the same time thereby speeding the update process substantially.

If a community member updates a content component, the index entry for this content may be automatically pushed to the community keeper and the community version number will be incremented. The corresponding index change or changes may be pushed to the community keeper. Assuming that this update does not create a conflict, the keeper may apply these changes to the master copy of the community index. Once the community keeper has accepted the index changes and the new community version number has been assigned, the contributing peer may broadcast the newly accepted changes to all other online members of the community. All peers may then apply these changes to their local copies of the community index. Those peers who are "subscribers" may also acquire the underlying content as described later in this document.

The responsibilities of various exemplary components of the system of the content synchronization mechanism module are discussed. The module may include a server, a Community Keeper, and a User Peer.

The server may have several responsibilities, including initial user authentication, maintaining a table of users related to communities, maintaining presence information, maintaining current community keeper list, Community Indexing and Ratings, and maintaining a count of members active in a given community.

The community keeper may have several responsibilities, including tracking the current version number for the community, determining community presence information, maintaining a master copy of the community index, maintaining a community member list, and enforcing membership policies. Additionally, the community keeper provides relay services from one peer to another when needed, periodically, persists back up copies of the master reference version, and triggers the creation of new Peer Community Keepers as needed.

The user peer may have several responsibilities, including reporting offline peers to community keeper, reporting offline community keepers to the server, acquiring and maintaining a current copy of the community index (subscribers may acquire and maintain a current copy of the community content), serving updates to other peers as requested, and providing reliability statistics. "Reliable" peers may serve as storage locations for other peers and/or perform file relay services.

The process of content based synchronization begins when a peer may log on to the server (client/server communication). The server may then respond with a community keeper peer name and the online status of buddies.

Next, the peer may join community peer group(s) and the peer contacts the community keeper and acquires a list community members, their presence status, their version numbers, and membership type (subscribe vs. join) along with the current community version number. Here, there may be two types of presence status; (online/offline) and Community presence (active/inactive). "Active" members are those who have the community open in their client.

The peer may then broadcast availability (online and active status) to the peer group and to all online group members. If the peer changes availability, changes activity status, or disconnects normally, the peer may broadcast it's offline (or changed) state. The peer may also send client/server message to the server (for all changes other than community "active" status), and the peer may send availability message to all online group members (for all changes other than community "active" status).

If the peer disconnects abnormally, the first peer to try to contact this disconnected peer may notify the community keeper of the peer's unavailability, and the community keeper may verify that the peer is unreachable. The community keeper may then assume the role of broadcasting the status change message across the community and notifying the server. Thereafter, the community keeper periodically notifies the server with the number of "active" users.

The synchronization of the present module 110 includes both index and content synchronization.

When file content is added or updated, the following operations may occur:
1. User drags a file into the Resource Grid or clicks the Synchronize button. If the user's storage peer is anything other than the local computer, the file is uploaded to the storage peer and assigned a unique ID; and
2. The peer requests an index update per the previously specified algorithm. The index update will contain a pointer to the file and a checksum of the current state of the file.

For certain types of resources (for example, a shared Word document), it may be possible for a user to maliciously or unintentionally corrupt a file. To prevent this corruption, the system of the present embodiment may allow content to be marked as "versioned". This is accomplished by maintaining a "smart folder" in the community properties, and may be handled entirely by the client. In operation, when a new version of a "versioned" resource is downloaded to a peer, the file is saved twice—once with the resource file name, and once with the resource file name plus a version number extension (e.g., MyDoc.txt and MyDoc.v1.txt). The user may right-click a community resource in the resource grid or the local drive and choose to "View Version . . . " or "Replace Version . . . ." To replace a version, the source version (e.g., MyDoc.v4.txt) is copied over the current version (e.g., MyDoc.txt txt), resulting in a new community-wide version (e.g., MyDoc.v6.txt).

As noted above, in an embodiment, the system 100 may employ a PEER/KEEPER Index Synchronization Algorithm. The architecture supporting this algorithm is discussed.

A peer may log on to the system. The server may provide the user with an authentication token that may be validated by the communities to which the peer connects. The peer may then elect to "open" a community.

The peer may contact a keeper registry to determine the current keeper for the community. The keeper registry may be a sever-based application and communication may be client/server based. The keeper registry may maintain a lookup between the community and the list of keepers currently serving that community. This list may be known as the keeper pool. Keepers may be accessible via TCP/IP addressing. That is, keepers may be identifiable and capable of accepting connections addressed to an IP address and port number. There may be three types of keepers, including public keepers, dedicated keepers, and user peer keepers. A public keeper is potentially available for use by any community. A public keeper may not typically be an "end-user" peer. A public keeper may have a continuous availability profile and a static IP address. A dedicated keeper may be available for use by a defined list of communities, have a continuous availability profile, and a static IP address. A user peer keeper may be available for use by those communities to which the user belongs, have an intermittent availability profile, and a static or dynamic IP address.

The keeper registry may then respond to the peer with the IP address and port number of a keeper for the community, along with an authentication token. The keeper registry may provide "load-balancing" between keepers. The keeper registry may assign an additional keeper to a community if the current keeper pool is "overloaded." The process by which an additional keeper may be assigned begins by choosing a dedicated keeper for the community that is online. If no dedicated keeper is available, an online user peer who is a member of the community and who may accept connections may be selected. If no capable user peer keeper is available, a public keeper may be selected.

The peer may construct an in-memory copy of its local community index ($I_{LOCAL}$). The community index may be a collection of index entries ("IE")($I=\{IE_1, IE_2, \ldots, IE_N\}$). Index entries may contain a small piece of atomic information about a logical item within the community. That information may or may not be a reference to a physical piece of community content, such as a file ("content"). For example, the information may be a file index entry which may point to a file available in the community and which may contain basic file information and tags. Alternatively, the information may be a folder index entry which may describe a logical folder or directory in a community and which may contain the folder name and definition of required tags. Each index entry may contain a GUID (Globally Unique ID). Each index entry may contain a version number (V(IE)). Each index entry may contain a "dirty" flag which may indicate that the entry is change since it was received. Each type of index entry may be associated with a persistence policy. Persistence policies may dictate which index entries should be persisted at a local peer between sessions. Exemplary persistence policies are discussed. When content is local, the index entry may be kept only when related content is locally available. When content is available, the index entry may be kept only when related content is currently available at some peer within the community. If the persistence policy is always, the index entry made always be kept. If the persistence policy is never, the index entry may never be kept. If the persistence policy is until expiry, the index entry may be kept until the defined expiry date.

The process of assembling a local version of the community index begins by opening a folder on the peer file system used to maintain information about the community. Persistent information for each community index may be maintained in a directory on the file system. For each subfolder within the community folder, operations may be performed. First, for each physical file (community content stored at the peer) in the folder, the associated persisted index entry may be found. Index entries may be persisted in a hidden folder as discrete files (e.g., C:/Community/Folder/.sample). Index entries may be given unique names derived from the names of the files they reference (e.g., MyPicture.jpg.meta). If an index entry exists, it may be added to a local, in-memory cache of local index entries. If an index entry does not exist, one may be created based on the information available (e.g., file name, file attributes, which may include tags in tagged file formats, and GUID). Second, an index entry for the current folder may be found or created in a similar manner.

After the peer constructs an in-memory copy of its local community index, the peer may connect to the keeper identified through the registry. This connection may be a persistent TCP/IP socket connection, using the IP address and port number provided by the registry The keeper may validate the peer's authenticity using the authentication token provided at login.

The keeper may send the peer the current, aggregate community index ($I_{COMMUNITY}$) or the connection information for a directly-assessable peer who may provide this information. Current community conditions, such as the availability of directly-assessable peers and the bandwidth available at the keeper, may dictate whether a direct or indirect transmission of the community index is appropriate. The community index may be compressed using a standard ZIP or GZIP compression algorithm.

The peer may receive, unpack, and process the current community index. A set $\{P\}$ of index entries containing all index entries (IE) in $I_{LOCAL}$ may be created. For each $IE_{COMMUNITY}$ operations may be performed. The $IE_{LOCAL}$ in $I_{LOCAL}$ with the same GUID may be found. If $IE_{LOCAL}$ exists, a determination regarding $V(IE_{LOCAL})$ relative to $V(IE_{COMMUNITY})$ may be made. If $V(IE_{LOCAL})$ is greater than $V(IE_{COMMUNITY})$, $IE_{LOCAL}$ may be kept in $I_{LOCAL}$. If $V(IE_{LOCAL})$ is less than $V(IE_{COMMUNITY})$, $IE_{COMMUNITY}$ may replace $IE_{LOCAL}$ in $I_{LOCAL}$, and $IE_{LOCAL}$ may be removed from the list of entries pending broadcast ($\{P\}$). If $V(IE_{LOCAL})$ equals $V(IE_{COMMUNITY})$, $IE_{LOCAL}$ may be removed from the list of entries pending broadcast ($\{P\}$). If $IE_{LOCAL}$ does not exist, $IE_{COMMUNITY}$ may be added to $I_{LOCAL}$.

The peer's local index ($I_{LOCAL}$) may now contain the aggregate knowledge of all active members of the community, plus the local knowledge available on the peer. This additional knowledge may be "shared" with the rest of the community. The nature of index entries to be shared include "non-versioned" entries to be "versioned" and "added" to the community, "versioned" entries known at an earlier time, but unknown to the current group of active members, and "versioned" entries known to the current group, but for which the peer has newer information.

The process for sharing this additional knowledge begins by the peer creating a compressed representation of $\{P\}$ containing only those index entries to be shared. The peer may send $\{P\}$ to the keeper to which the peer is connected. The keeper may unpack $\{P\}$, and for each IE in $\{P\}$, a determination may be made regarding whether or not the IE has a version number (and is not marked "dirty").

If the IE has a version number (and is not marked "dirty"), the corresponding IE ($IE_{LOCAL}$) in the keeper's local index cache ($I_{LOCAL}$) may be found by matching on GUID. $IE_{LOCAL}$ is then compared with IE in $\{P\}$ ($IE_P$). If $V(IE_{LOCAL})$ is greater than or equal to $V(IE_P)$, $IE_P$ is discarded. If $V(IE_{LOCAL})$ is less than or equal to $V(IE_P)$, $IE_{LOCAL}$ is replaced with $IE_P$. If there is no matching $IE_{LOCAL}$, then $IE_P$ is added. The "Add/Replace" actions may be taken in $I_{LOCAL}$. The "Add/Replace" IE may be added to be broadcast $\{B\}$.

If the IE does not have a version number (or is marked "dirty"), further operations may be performed. A new version number may be acquired. Each community may use a single, ever-incrementing sequence to assign version numbers. Each submission of new information to the keeper will cause this version number to be incremented. The index synchronization algorithm works independent of how the version number to be incremented. The index synchronization algorithm works independent of how the version number is acquired. However, the greater the guarantee of sequentially-accurate version numbers, the better the reliability of the community data. Sample version number management schemes are discussed. In a client/server scheme, a new version number may be retrieved from a central, guaranteed source. The server may increment the version number. While this is a simple and guaranteed approach, it requires extra messaging and is centralized. In a keeper registry managed scheme, the keeper registry may provide a last known version number when assigning a new keeper, and this number may become the starting point. Keepers may report the current version number periodically and before shutdown. Keepers may increment the version number themselves. This approach is less centralized, and requires less messaging. However, this approach does not offer guaranteed accuracy with a disorderly keeper crash. In a keeper registry managed approach, a two part operation may be followed. The keeper registry may assign a new "major" version number after each keeper shutdown. Keepers may manage their own "minor" version numbers, starting from "0" each time accurate information is unavailable due to a break in the keeper "chain of custody." This approach may offer guaranteed accuracy and less messaging. However, this approach may be complex and require large size version numbers.

After the version number is acquired, it may be assigned to the IE. The IE may then be added to $\{B\}$, and changes may be broadcast to all active community members.

After the keeper unpacks $\{P\}$, other active peers and active keepers for the community may receive updates to the community index, represented by the collection of index entries $\{B\}$. These updates may be processed similarly to the comparison of $IE_{LOCAL}$ with IE in $\{P\}$ ($IE_P$), with actions taken on the peer's local $I_{LOCAL}$.

Peers in the community may submit additional changes to index entries or new index entries at any time. The process governing the management of these added or changed entries is a simplification of the process above. When a peer adds an index entry, the added index entry may be added to a set of changes to be submitted ($\{P\}$), and may subsequently be treated as described above with respect to the process of sharing additional knowledge with the rest of the community. When a peer changes in index entry, the index entry may be marked as "dirty." The index entry may be added to a set of changes to be submitted ($\{P\}$), and may subsequently be treated as described above with respect to the process of sharing additional knowledge with the rest of the community. It should be noted that this may be where the use of the "dirty" check described above may be used to assign a new version number to an existing object.

The index synchronization algorithm maintains a dynamic centrally-managed index for each community that is comprised of the latest information on the content managed by that community available at a time. It is highly resilient and scalable and it incorporates both load balancing across multiple centralized index keepers, and, as discussed below with respect to the Keeper Failover Mechanism Module 150, as self-management by recognizing central index keeper failures and automatically recovering from these failures.

In addition, the algorithm is highly efficient, as a peer has only one hop needed to access the latest index information. It allows multiple peers to update the index at the same time and reconciles all changes, and adds and deletes at the centralized index keeper. This algorithm also offers substantial network efficiency improvements over the existing centralized and broadcast models of peer-to-peer index synchronization. Because messages may only be generated when a peer joins a community for when a peer requires an update, there are no unnecessary messages for polling or to check to see if a peer is still up to date.

By achieving these benefits, this algorithm achieves the utility of both the centralized and broadcast models of managing peer-to-peer content without incurring the client/server models single points of failure or the broadcast peer-to-peer's heavy overhead and content discovery.

The relay keeper may float which adds both privacy and stability to the network. There may be no single, central collection of all data, nor a single point of failure. If a keeper is blocked or goes down, the algorithm knows to find another keeper. This process is defined as described below with respect to the Keeper Failover Mechanism Module 150.

In another embodiment, a two part community index may be provided. In this embodiment, an approach to synchronizing community indices may be provided. This approach may include a two part community version number (X.Y) where the first part (X) represents a "chain of custody" for the index and the second part (Y) operates as a current version number as discussed above. In this embodiment, the X value may begin at 0 and may be incremented whenever a disorderly transition of the relay keeper occurs and the relay keeper index must be rebuilt from the indices contained by the online member peers. This embodiment offers the added benefit of being able to detect version number conflicts that may be created when disorderly relay keeper transitions occur. If in the event that a disorderly relay keeper transition occurs and the version number regresses to an earlier value than the most current value, the presence of the first part of the community version index may allow the new relay keeper to tell the difference between two content items with the same Y value in the community version index and update the master index accurately.

By avoiding a single point of index storage and enabling the keeper to float among the different index storage peers, our architecture allows each new user to add to the computing resources of the community. As the community grows, its storage and computing power may grow along with it.

By avoiding a single point of failure, the architecture may add to the resiliency, privacy, and ability to defend freedom of speech of the community. A community with multiple subscribers (who download all content) may not be subject to the failure of a single keeper. Nor may such a community be as vulnerable to governmental and other intrusive filtering as applied by some totalitarian states. A community lives through its users, and not a single source point on a router it may be more difficult for an outside party (outside the community) to police, allowing for a freer flow of information and speech. Finally, because messages in this architecture may travel directly from sender to receiver, the may be no intermediate storage points where they may be collected, decoded, and read.

The system and method of the present invention utilizes peer-to-peer chunk caching to exploit the benefits of the peer-to-peer network. Chunk caching, while effective for moving large volumes of data in a client-server setting, has heretofore not been used as effectively in a peer-to-peer network. This is because of the nature of data transmission in a peer-to-peer network where in many cases, peers cannot communicate directly due to firewalls and other issues, and so must communicate through a relay peer. When two peers within a network who are not capable of accepting inbound connections must share a file, a relay peer must be selected as a rendezvous point for any exchange of information. As such, packets may be routed not only from Peer A to Peer B, but from Peer A to Relay Peer R to Peer B. In a typical peer-to-peer file share network, it is impractical to provide significant optimization of these transmissions. While faster relay peers may be used, the fundamental requirement for this "two-legged" transmission remains wherever it is dictated by the network typology of the peers.

An embodiment of the present invention introduces an innovative mechanism to store cached file chunks on the "community based" relay peer in order to transmit files from said relay peer in each discrete community where the context of the relay is based on technical criteria, but on social criteria of the community the peer serves. In a sense, this embodiment's relay peer acts in the peer-to-peer network as a server does in a client-server architecture: storing data so that it might be transmitted directly from the requesting "edge peer" in a single hop rather than jumping from edge peer to relay peer and then to requesting. For purposes of this discussion, a community based peer-to-peer network may be a set of computing devices, connected to the Internet, with the following attributes: (1) devices may be spread across a number of local networks; (2) all devices (peers) may have the capability of initiating a TCP/IP connection to a public IP address; (3) a subset of devices may have the capability of accepting an incoming TCP/IP connection via a public IP address (relay peers); (4) a subnet of devices without a public IP address or without the ability to accept an inbound connection (edge peers); and (5), devices may be logically divided into subsets (communities) which have a shared interest in particular content.

The peer-to-peer chunk caching operation operates on the community based peer-to-peer network. The peer-to-peer network may be provided containing peers $\{P_1, \ldots P_N\}$. The network may be logically divided into communities containing: (1) dynamic peers in the overall network; (2) at least one relay peer at any given time; and (3) a dynamic subset of files relevant to the community where each file is available at 1 . . . N nodes within the network. An edge peer ($P_{REQUESTOR}$) may initiate a file acquisition process, selecting a file (F) for download. Each peer is assumed to have access to an index of content available within the community. $P_{REQUESTOR}$ may create a list of file "chunks" that should be acquired. The index entry for each file may contain the length of the desired file in bytes ($F_{LENGTH}$). A constant chunk size (CHUNKSIZE), predetermined and known to all peers in the community, is used to determine the number of chunks required (ChunkCount=Ceiling($F_{LENGTH}$)/CHUNKSIZE. A file may be described as the aggregation of these numbered chunks (File={$C_O \ldots C_{ChunkCount}$}). $P_{REQUESTOR}$ may request individual chunks from a relay peer in the network (R). Chunks may be requested by a unique file identifier and a chunk number. R may receive a request for chunk $C_N$. R may inspect a local cache of file chunks ($R_{CACHE}$). If $C_N$ exists in $R_{CACHE}$, $C_N$ may be immediately returned to $P_{REQUESTOR}$. If $C_N$ does not exist in $R_{CACHE}$, R may inspect a list of outstanding recent requests for chunks that have not yet been fulfilled ($R_{PENDING}$). If a request for $C_N$ is pending, add $P_{REQUESTOR}$ to a list of peers waiting for $C_N$. Pending requests include a timeout, after which the request for $C_N$ may be processed as though it was not in $R_{PENDING}$. If $C_N$ does not exist in $R_{CACHE}$ or $R_{PENDING}$, the request may be forwarded to a peer in the community that may have the file available ($P_{PROVIDER}$). The request may be added to $R_{PENDING}$. File availability at a given node can be determined in a number of different ways, and is immaterial to the caching algorithm. Non limiting examples include relay maintenance of a file availability map based on peer reporting (full or partial), broadcast queries, and client/server maintenance of a file availability map. As required, $P_{PROVIDER}$ may receive requests for chunks of the requested file. $P_{PROVIDER}$ may construct the appropriate chunk from the known CHUNKSIZE and chunk number, providing bytes (CHUNKSIZE*N) . . . (CHUNKSIZE*N+CHUNKSIZE) of the file to R. R may receive $C_N$ from $P_{PROVIDER}$. R may enter $C_N$ into $R_{CACHE}$. Any caching mechanism may be used to manage the size and performance of $R_{CACHE}$. R may forward $C_N$ to $P_{REQUESTOR}$. R may forward $C_N$ to any other peers in the pending list for $C_N$. Peers may be removed from the pending list as chunks are delivered. After all chunks have been received by $P_{REQUESTOR}$, the chunks may be combined and the requested file may be reconstituted.

While relay peers and caching are known, their use in a peer to peer setting may only be realized in a community-oriented network. In an unstructured peer-to-peer environment, a given relay peer may be unlikely to serve the same file to multiple peers on a frequent basis—there are too many potential "chunks" in the universe of peers. However, when a peer-to-peer network is logically subdivided into social groups/communities, the probability of a duplicate request grows dramatically—and hence—a caching strategy becomes massively effective in mitigating the disadvantages of indirect connectivity between peers. An embodiment structures each community so that there is a single relay keeper at any one time per community. Thus, all data can be stored on that relay and transmitted from there efficiently.

Community Based Content Management Module 120

The community based content management module 120 of the present embodiment may incorporate an innovative organization and management of content within a community context. Indexing standards may be created by communities of users. This is in contrast to conventional systems in which indexing standards are not created by central authoritative experts or left to every individual taste. Creating indexing standards by communities of users enables the emergence of de facto standards through competition of indexing schemes. For example, one user in the community may label content with one particular index scheme, while other users may organize the same content in a different fashion. Over time, the community adopts as preferred index and manner of organizing and characterizing the content the index and manner that is more commonly used by the community.

The following capabilities of the present embodiment enable this functionality: a central dictionary of tag set definitions which users both contribute to and reference; a ratings mechanism of tag sets so more useful definitions are propagated; and a smart folder to enforce discipline on use of tags and tag values.

It is to be appreciated that community organization of content is different from existing content management methods that rely on a centrally managed hierarchical index or on distributed user-based preferences. Hierarchical content management approaches establish a content hierarchy that is managed by experts and content is then assigned into nodes on this hierarchy. An example of this approach is a card catalog within a library. A standard hierarchy is established by the Dewey decimal system, and librarians make assignments of content (in this case, books) into this hierarchy. This approach is heavily dependent on a central standard set of rules for organizing content and is well suited for establishing consistency and enables an "apples to apples" grouping and comparisons, but suffers from rigidity and lack of flexibility that stems from the highly centralized nature of the index management.

At the opposite end of a management spectrum is user-based, preference-based content management. User-based approaches to manage content rely on individual content users to "tag" content to establish logical groupings for this content. This approach is very flexible and allows for great deal of flexibility in the organization of content. However, there are real difficulties in establishing consistency between different user's tagging methods. Flickr and del.ico.ious are two user-based content management systems in place today that exhibit these types of characteristics. Facebook implements a tagging scheme that is hard-coded to user names from the Facebook authorized user list. In this sense, it is a centrally-managed content management scheme even though it does not implement any hierarchical organization. The tagging approach of the present embodiment is fundamentally different from Facebook's picture tagging approach in that the tag definitions and tag values are determined at a community level as opposed to centrally.

The present embodiment establishes a hybrid content management method based around the concept of communities that combines the strengths of both approaches and mitigates the weaknesses in each approach to better organize and categorize content. In this approach, the minimum allowable tag types are established at the community level. A community may be a dynamic logical grouping of people with a common interest such as collecting Pez dispensers or studying black holes. The person or persons managing the community keeper establishes what tag types are required for different types of content through the SmartFolder feature of the present embodiment. The actual tag values set for an individual content component are set by the content creator or contributor to the community and are user-based. But the tagging types and rules about what's mandatory and what is not are established centrally by the community. Different communities may cover the same subject area and establish different tagging types and rules. Over time, the community with the better tagging types/rules may predominate. In this manner, the communities may compete to offer the best content management methods and will go through ongoing improvement and streamlining.

The inventors have found that community-based content tagging has particular value in resolving the problem of synonyms inherent in current text based searches and user preference based tagging approaches. Because tags may be defined within communities which are organized around a particular affiliation or interest, the meaning of a particular tag value (e.g. "Paris") may be resolved from the community-specified "tag set" in conjunction with the tag. So in our example, the "Paris" tag value in the "Celebrity" community is associated with the "Name" tag in the "Celebrity" tag set, as opposed to the "City" tag in a "Location" tag set in the "Travel" community. Due to this, the value "Paris" will be easily understood as referencing "Paris Hilton" as opposed to "Paris, France". Conventional text searches of "Paris" and tag searches across tagging systems without the community concept are unable effectively to differentiate between the different meanings of synonyms.

The process of community based content management of the community based content management module 120 is discussed. The present embodiment provides an inventory of tag sets, which may be groups of tags that may be used to describe content. Tags and Tag Sets may be created by users of the present embodiment and then published to the Dictionary. Once these Tags and Tag Sets are contained within the dictionary, they may be public and searchable and may be used by anyone who wishes to organize content within a community. It may also be possible for users to create Tags and Tag Sets that are used only within a community and not published to the Dictionary. These Tags and Tag Sets are considered "User Tags" and may remain private. Tags and Tag Sets contained within the Dictionary may be rated by users.

A community may be created by a community owner and established using a network node known as a Community Keeper. The community may define the types of content that it will contain through the use of smart folders. Smart folders are containers for content and have one or more tag sets associated with them. When a community member adds content to a smart folder within the community, he then may be asked to tag this content with tags contained in the tag sets associated with the smart folder into which he is contributing his content. Some tags may be mandatory, and some may be optional. Some tags may have a list of valid values, and others may be free form text or numerical values.

If a user moves or copies content from one smart folder to another (either within a community or between communities), the tags may move with the content. When there is a difference between the tag sets defined between the two smart folders, an embodiment will map the tags based on tag name. Those tags that match will move with the content. Those tags that do not match will be dropped.

The process of community based content management of the present embodiment may include the following operations:

1. Create a smart folder to house a specific type of content within a community. To do this a user uses the 'Create Smart Folder' feature to name a smart folder and provide some text as guidance as to what the purpose of the smart folder is and what types of content are intended to be housed there. The user may optionally specify rules as to what content is allowed and disallowed in this folder.
2. Add a tag set or tag sets to the smart folder to describe the organization of content in the smart folder. This involves searching for pre-existing tag sets that may be reused on the Dictionary. If a tag set is found that is adequate, then it may be selected and used for the new smart folder. If no adequate tag set is found, then a new one may be created using the Create Tag Set feature. Tag sets that are created may be optionally published to the Dictionary. Multiple tag sets may be added to a smart folder and the superset of tags from the tag sets will be applied to the smart folder.
3. Valid tag values are then specified for each tag. Free form tags are also allowed. Mandatory and optional tag completion is also specified.
4. Then tag rules may be established to provide for linkage of valid values between tags. So for example if the tag named "Style"=123345 then the tag name "Size" may be between 2 and 18.
5. Then the smart folder is opened to receive content.
6. When content is added to the smart folder, the user adding the content is then prompted to supply the tag values required by the smart folder.
7. These tags and tag values are then used by the resource grid to allow users to find content quickly and easily.

Integrated User and Content Rating Module 130

The integrated user and content rating module 130 of the present embodiment may incorporate an innovative interaction of content ratings and user ratings along with user behavior to establish the value of content. The aggregate rating of content submitted by a user may be a significant component of that user's score. In turn, the user's score may affect the voting power of the user when rating the content contributed by others. This rating system is a novel approach to rating because while the content ratings may be established by users (as opposed to a central rating authority) the ratings submitted by a users may be adjusted (weighted) based on the status of the user. So, for example, a respected user's rating will count much more heavily than a new user's rating. The rating for a component of content thus depends on the absolute rating submitted by users and the user rating within a community, as well as the user's behavior in that community.

Likewise, a user's rating may be affected by the rating of content he contributes. For example, if a highly rated user contributes content that the community rates very low, that user's rating may be decremented.

In contrast to the rating system of the present embodiment, most existing rating systems are either reliant on a central rating authority such as JD Power or are completely bottoms-up such as the user-based rating systems that exist on eBay where buyers rate sellers and vice versa. There are a few examples of rating systems that interface user rating and content rating, but in a static way that does not account for user behavior.

The ratings process of the present embodiment may include the following three inputs, including user ratings, content ratings, and user behavior. User ratings are based on the ratings of content submitted by user. Content ratings are based on the ratings from users adjusted for voting power (from user rating), and user behavior is based on length of user membership in the community, length of member ship in a community, whether a user sets up his primary peer as a rendezvous server, and whether the user submits content to a community.

The rating approach employed in the present invention capitalizes upon the use of all three of the aforementioned factors in a rating method. This approach provides an innovative manner and method in the way in which users and content ratings interact.

In the rating system of the present embodiment, one's voting power is based on the ratings of what one contributes rather than one's ability to approximate the mean rating. So if a user has submitted a content item that is universally praised, then his opinions are heavily weighted regardless of their relation to the mean. This may be described as an "Editorship" approach to content evaluation. People voted as experts do the bulk of the rating rather than people voted as non-experts. In our example above, if a user rates an item as a 7 which has a mean rating of 3, and that user is an "expert", rather than have his rating discounted (and the mean rating change little) his rating is heavily weighted, and the mean may increase substantially.

In contrast, known systems such as Digg and Apple rate a user based on the ability of that user to rate things that approximate the mean rating of a content item. So if something is generally a 3 out of 10 and a user rates it a 7, that user would lose voting power not gain voting power.

In the approach of the present embodiment, a user loses or gains voting power based on the content submitted by a user, (not the content rated by a user). This has very basic and fundamental differences. The Digg/Apple algorithm compares a user to the mean/avg rating and rewards consistency with the average. This discourages opinions that are out of the mainstream thought and rewards opinions that are consistent with the mainstream. In the Digg/Apple method all ratings will tend to regress to the mean, because users out of step with the crowd are discounted. This is of value in understanding if a user is a "typical" user or an outlier but of little value in judging the quality of content. This may be described as a "consensus" based or "market based" rating system.

Centralized rating systems are only as good as the rating authority and do not exist for most content categories. Where they do exist they are expensive and generally not current with the latest content changes. User based content rating systems are much more dynamic and usually free but are subject to being gamed. Therefore it is difficult to rely on these user based systems. In recognition of this, in the present embodiment, the user rating is dependent on the community context. Because it is likely that an expert in, for example, Pez Dispensers will not also be an expert in Black Holes, that user's rating is community sensitive. That user's content rating will count a lot in the Pez community but perhaps less so in the Black Hole community.

Community Rating Method

In addition to rating individual resources within a community, communities themselves also have associated ratings. These ratings may be determined by the following factors, including a direct community rating, a collective member score, and an average resource rating.

A Direct Community Rating (D)

The direct community rating is determined by the direct vote of any user who is a member of the community. By way of a non-limiting example, a rating plugin, identical in appearance to the resource rating plugin, may allow a user to rate a community in which they participate. That is, a user's voting power will again become an important factor in his/her ability to rate the community.

A Collective Member Score (M)

A community is only as good as its people. As such, a portion of the community's rating may be based on the total user scores of its members. By using the total user score, rather than an average, you reward both communities with high participation and at least "non-malicious" users, as well as smaller communities with a group of highly-rated users.

Average Resource Rating (R)

The value of a community is tightly coupled to the content that it contains. As such, the average rating of all content within a community is a critical component of the rating algorithm.

To capitalize upon these factors in determining a community rating, one exemplary method may be used to resolve a member score, where different weighting constants or variables may be chosen to weigh the rating factors. For example, one set of constants may include be represented by the equation below, where the direct community rating contributes 50%, the collective member score is weighed depending upon the maximum, minimum, and beginner scores, and the average resource rating may contribute 25%. This example of the method of determining the community rating is depicted below, where the aforementioned realities of rating contribute to resolve a member score (C):

$$C=0.5(D)+0.25(MIN((M/1000),5)+0.25(R)$$

Some sample scenarios for the Member Score portion of the method include a small community with 5 "experts" with a user score of 1000: MIN(5000/1000,5)=5. Additionally, there may be a large community with 100 users with a beginner score of 10: MIN(1000/1000,5)=1. Likewise, there may also be a large community with 500 users with a beginner score of 10: MIN(5000/1000,5)=5.

It is to be appreciated that since a user score may be negative, malicious users allowed into a community will adversely affect the community's score. Also, the member score and community rating information reside on the main peer. Further, average resource ratings are periodically reportable by a member of the community, such as, by way of a non-limiting example, the community keeper.

The following is an illustrative, non-limiting example of an application of the present embodiment and a method for determining and evaluating ratings.

1. Star Rating (S)—Rating from −5 to 5, as provided by a User.

2. User Rating (U)—A non-capped point system for rating users.

A user gains points on their user rating by:
  a. Submitting a rating on an item (0.25 Points). Capped at 20 points per day.
  b. Contributing highly rated resources
  1) No points just for contributing
  2) Points calculated as:
    a) Item Rating*MIN(Number of Ballots, 20))/10
    b) Max Rating Example $$(1) 5*MIN(1000,20)/10=5*20/10=10$$

All New Users begin with U=10 points.

3. Voting Power (V)—The number of "ballots" a user may cast when rating an item.

Voting Power is calculated using the formula:

$$V=MAX(\log_{10}(U),0)$$

4. Item Rating (R)—The item's weighted average Star Rating

The weighted average is calculated as:

$$R=SUM(V*S)/SUM(V)$$

Point System Awards (example):
−100 Level 1
−50 Level 2
−33 Level 3
−25 Level 4
−10 Level 5
0 Level 6
10 Level 7
15 Level 8
20 Level 9
25 Level 10
50 Level 11
100 Level 12
250 Level 13
500 Level 14
1000 Level 15
1750 Level 16
2750 Level 17
4000 Level 18
5500 Level 19
7500 Level 20
10000 Level 21
25000 Level 22
50000 Level 23
100000 Level 24
250000 Level 25
1000000 Level 26
10000000 Level 27

Ratings will drive the behavior of many aspects of the present embodiment. This will ensure that the ratings are meaningful and that users associate value with a high rating. Users will be granted privileges based on their user rating. So joining a community may be restricted based on the user rating.

Content downloads/synchronization will be filtered by content rating. Searching may be prioritized based on ratings.

So, for example, tag sets will also be rated so that when users search for a tag set, we will list the highly rated tag sets first.

Multidimensional User Interface Resource Grid Module 140

The multidimensional user interface resource grid module 140 of the present embodiment may incorporate an innovative user interface (UI) component for imposing a user-defined tree view of tabular data, which supports unlimited sort dimensions on-demand at run time. To accomplish this, the present embodiment generates a unique flexible display format combining a hierarchical view and a flat list view, with the boundary between the two views determined at run time by individual users. This display format permits the display variable column widths together with a hierarchical tree viewer. This UI supports different ways of looking at the same data.

Navigating through a community-based content management, especially one covering the entire Internet, requires sifting through an enormous amount of content. To better manage this, the UI resource grid of the present embodiment combines the hierarchical organization of a tree viewer with the filtering capability of tagging approaches. To review content, a default hierarchy is presented to a user within a given community. However, a user may choose the sequence of tag indices that he wishes to traverse in order to best locate or discover the content he is seeking. A grid of data may then be sorted by the tags and not by static columns as is customary.

Tabular Data that may be viewed using the multidimensional resource grid of the present invention, including any "tags" assigned to an index entry (interaction record). As shown below with the example of a "Baseball Player," a tag set describing the classification criteria for a baseball player (position, average, team, etc) is attached to a "smart folder". This assures that all index entries placed in that smart folder are classified using this defined scheme. As a result, the logical data in that folder can be thought of as having a tabular structure where the "column headers" are the tag names and the "rows" are the index entries. This tabular view may be manipulated into a hybrid hierarchical/flat view as shown in the example below.

The process of providing and using the multidimensional UI resource grid is discussed. First, a user logs in and is authenticated. Then those communities to which the user belongs are loaded to his Desktop. Next, User clicks on a community that he wishes to view. Then, the resource grid, located by way of non-limiting example, in the upper left corner of the desktop, loads with the first tag level displayed of the default tag sequence. After that, a user selects one of the displayed tag values and double clicks it to expand it. Then, the tag values for the second tag in the tag sequence are then displayed. Thereafter, the user may continue in this fashion, or he may change the tag sequence by using the "Order By" function. If a user selects "Order By", then the tag sequence is modified so that a user may search for content in a different sequence. After that, modifying the tag sequence depth may also be determined by the "Order By" feature. For folders with relatively small quantities of content, the optimal tag sequence will be shorter than smart folders with larger amounts of content. So if user wishes to view an ordered list of content after just 3 tags in a tag sequence instead of the entire tag sequence of more than 3 tags, he may change the behavior of the resource grid to drop to an order list before the entire tag sequence has been traversed.

The following is a discussion of a non-limiting example of the present embodiment applied to a data set of baseball players. There are four attributes attached to a baseball player: Team, Name, Average, and Position.

Known UIs, such as Windows Explorer, enforce a static hierarchy/tree view of information. The Multidimensional Resource Grid of the present embodiment, in contrast, may allow a user to change the hierarchy on demand thereby providing a dynamic tree based view of tabular data not available in current tree based or grid based UI controls. The following Table 1 illustrates this dynamic tree.

TABLE 1

| Team | Name | Average | Position |
|---|---|---|---|
| Red Sox | David Ortiz | .333 | 1B |
| Red Sox | JD Drew | .245 | RF |
| White Sox | Jermaine Dye | .287 | RF |
| White Sox | Juan Iribe | .247 | SS |
| Yankees | Derek Jeter | .312 | SS |
| Yankees | Jason Giambi | .276 | 1B |

Figures 2A, 2B:
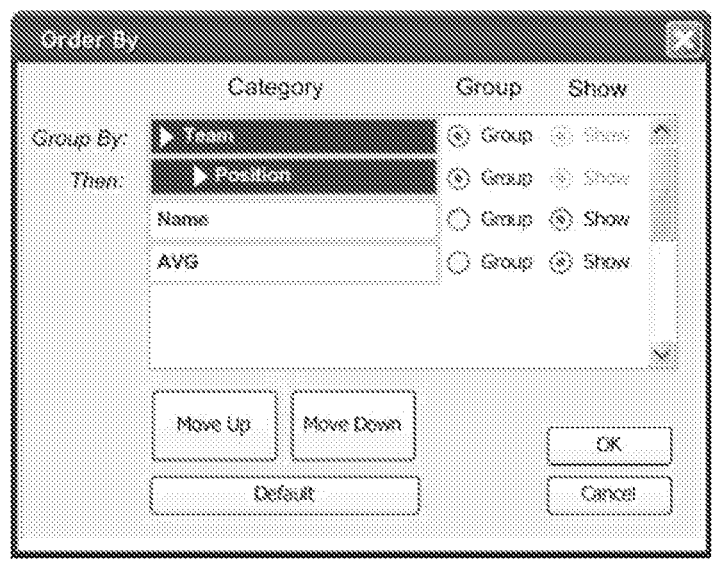
FIGS. 2A-D illustrates screen shots produced by a system and method in accordance with the present invention.
Figure 2C:
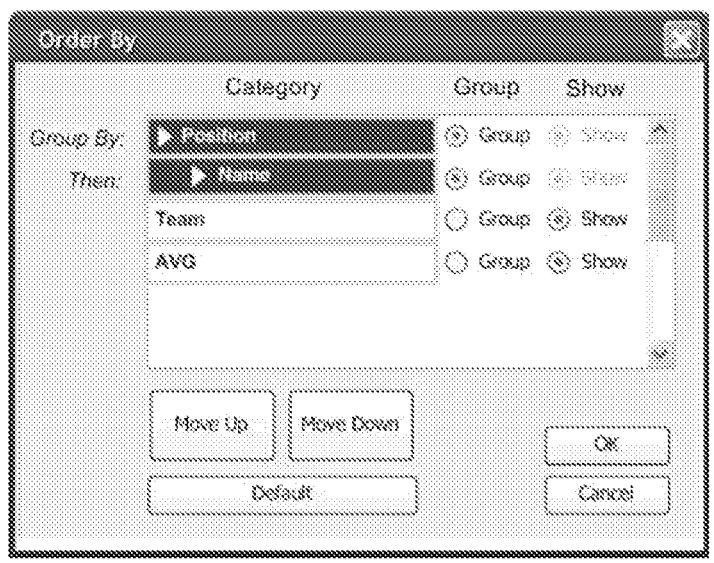
Figure 2D:
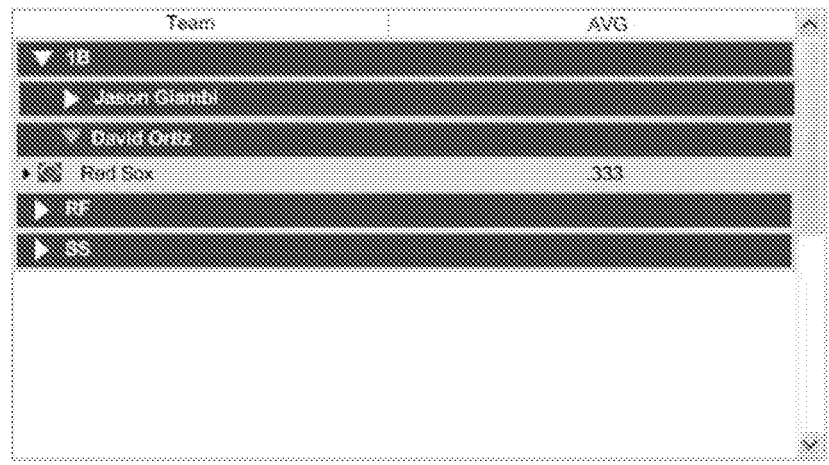

The present embodiment's innovative "Order By" dialogue may allow the user to specify when to transition from a tree view to a grid view at any point in the hierarchy. A user could click the "Order By" button to sort data in the order they want to specify. For example in FIG. 2A, they want to view all baseball players by Team then by Position, but they also want the ability to sort those results by Name and AVG. In the results in FIG. 2B, the user is viewing all Red Sox Players who played first base (IB). A user could also choose to search by Position then Name (FIG. 2C) since data in the present embodiment may be flexed in multiple ways. Or a user could view and sort these results by attributes: Team and batting average (AVG) as shown in FIG. 2C. Notice by switching the "Order By" sequence a user may find the same result in multiple ways. For example, if there were multiple Red Sox first basemen, then the user would be able to sort by Name or AVG after viewing their desired results. This would simply be done by clicking either the Team or AVG column heading, as shown in FIG. 2D.

Keeper Failover Mechanism Module 150

The system of the present embodiment also may incorporate a dynamic automated role assignment based upon evaluation of pre-determined fitness criteria against the characteristics of available nodes in a real-time network environment. As a subset, this system also may use this feature in a network environment with persistent content and indexes. In addition, this system may incorporate this feature in a peer-to-peer network.

The keeper failover mechanism module 150 may determine who the community keeper is or will be and may determine the updated content that the keeper may not yet possess. When the original community keeper becomes unavailable, a new user or node may be designated as the keeper. A likely candidate is the user or node that has the most up-to-date version of the content in question. The system of the present embodiment may determine which users are available to become the community keeper and if they have the most up-to-date content. The present system provides a dynamic and automatic handoff of the community keeper role by automatically detecting unavailability of the original keeper and triggering a process to determine which user or node is best-suited to become the keeper.

In the present system, and in other foreseeable peer-to-peer scenarios, selected nodes on the network play special "roles" in the context of the application's messaging logic. While these nodes are equivalent with respect to the logical network, they hold unique responsibilities within a defined subset (a community) of peers. In the system, these specially designated peers are known as "Community Keepers". The Keeper may be responsible for "directing traffic" within a community, coordinating operations such as community membership, presence, and content distribution. As such, correct operation of one keeper per community at all times is desirable. To maintain a robust and redundant network, the system of the present embodiment may implement a mechanism to dynamically select a new "keeper" when a previously selected "keeper" peer becomes unavailable.

An overview of the keeper failover process includes the following operations, including detecting the failure of a specially-designated node in a peer-to-peer network, electing the best-fit successor to the failed peer from a dynamic group of available nodes, and resuming normal operation of the network.

The keeper failover process of the present embodiment differs from conventional failover implementations because all nodes in the network are candidate failover nodes. As such, this list of possible failover sites is truly dynamic. This provides a level of redundancy and recoverability that grows with the network. Additionally, the keeper failover process of the present embodiment selects the failover node via a heuristic process in which all available nodes participate. No static central authority or "switch" determines the failover site. Further, the keeper failover process of the present embodiment assumes "pretty good" continuity of service. That is, to efficiently perform the keeper failover process, the system makes a number of assumptions to recover most of the data after a failover scenario, but there is no guarantee that all data (merely most) will be available after the failover.

The keeper failover process of the keeper failover management module 150 of the present embodiment includes the following operations.

1) The "Main" peer on the network, also known as the "Main Server", maintains a mapping between communities and the name of the current Community Keeper on a "Keeper Registry". By default, the Community Keeper is initialized to the creator of the community.

2) When a peer enters a community, the main server is queried to determine the appropriate Keeper to contact. The peer conducts a handshake with the keeper when initially joining or subsequently re-entering a community. This handshake initiates the peer's acquisition of presence information and the community index.

3) During normal operation of the community, presence changes and community index versioning are coordinated by the current community keeper.

4) If at any point, a community member cannot contact the Keeper, that community member will send out a "Keeper Failure" message to the Main Peer. Assuming the Main Peer is accessible, the main peer will attempt to validate that the current Keeper is inaccessible. The Main peer will note the current keeper position as "vacant" and not allow any new users online or offline until the position is filled. The Main Peer will respond to the alerting peer with an acknowledgement that allows the Alerting Peer to continue the Keeper election algorithm. If another peer has already reported the outage to the Main Peer, the new Alerting Peer will not be allowed to continue the algorithm.

5) The Alerting Peer will broadcast a "Keeper Failure" message to the community. The community member, now known as the Alerting Peer, will also notify the Main Server of this keeper outage.

6) Upon receipt of this Keeper Failure message, each peer will halt any current activity and respond to the sender with an acknowledgment. This acknowledgment will contain the state of the acknowledging node. This "state" contains the node's current index version number, uptime statistics, such as the amount of time active in the last X hours, and topology, including Internet addressability, firewalled, and the like.

7) The alerting peer will collect responses over the course of the next several seconds. If less than half of the available peers respond, the Alerting Peer will assume that its own connectivity, not that of the Keeper, was at fault and attempt to contact the keeper again. The alerting peer will score the respondents using a fitness heuristic. This heuristic will evaluate each peer's readiness to assume the role of Keeper based on their reported state. Currency of information (the version number), accessibility (response time and topology information), reliability (uptime statistics), and user rating are the critical weighted variables of this heuristic.

8) The alerting peer will select the top candidate and send a "Keeper Handoff Request" message to the winning (top) candidate.

9) The winning candidate may send a "Keeper Handoff Accept" message to the alerting peer within several seconds. If not, the alerting peer will repeat steps 4-6 of this process with the remaining pool of peers.

10) Once a peer has accepted the role of keeper, the alerting peer will broadcast the identity of the new keeper to the community and send an update to the main server.

11) All further coordination will continue through the newly designated keeper

Many computer processes may be "gamed" by a malicious peer. For this reason, peers may ignore/reject Keeper Failure messages from peers whose related user score is low. Also, to prevent such situations, this process may be modified such that the Main peer, rather than the alerting peer, manages the notification and election process. In this role, the main peer provides additional security at the cost of additional centralization and message congestion.

The process of a community keeper floating from device to device in the event the community keeper device shuts down (orderly float) or crashes (disorderly float) is discussed with respect to the above-discussed architecture supporting the PEER/KEEPER Index Synchronization Algorithm.

If the community keeper device shuts down (orderly float), the keeper may send a "shutdown" message to the keeper registry. The keeper registry may remove the keeper from the pool serving the given community. If the pool size is zero, the registry may assign a new keeper and add it to the pool. The registry may inform the new keeper of its responsibilities. The new keeper may connect to the old keeper and request a download of $I_{LOCAL}$ and other community maintenance information. The old keeper may send $I_{LOCAL}$ to the new keeper. The old keeper may notify all connected users of the shutdown, and of the new keeper's connection information. The old keeper shuts down. All peers reconnect to the new keeper. If the pool size is greater than zero the old keeper may notify connected peers of logoff, and connected peers may contact the keeper registry for a new keeper assignment.

If the community keeper device crashes (disorderly float), previously connected peers may recognize a broken connection to the keeper. The peers may contact the keeper registry to report the keeper outage and request a new keeper assignment. The keeper registry may record the keeper outage. If the pool size is zero, the keeper registry may assign a new keeper. All previously connected peers may be assigned to the new keeper. The peers may connect to the new keeper. Peers may all report their state as discussed above. If the pool size is greater than zero, the keeper registry may assign an existing keeper or grow the pool. Previously connected peers are assigned as would typically occur. Peers connect to the new keeper. Peers may need not report their state and full.

Serving Additional Content Based Upon Tags Module 160

The system of the present embodiment may serve advertisements and other content based upon tags via a module that serves such additional content. This system may provide tags which specify defined, domain specific content characteristics so that the system has detailed information in real-time on what the user is viewing. By targeting messages, such as advertisements and other ancillary content to the user based upon the tags being viewed, this system greatly increases the value of the message to the messenger.

Figure 3:
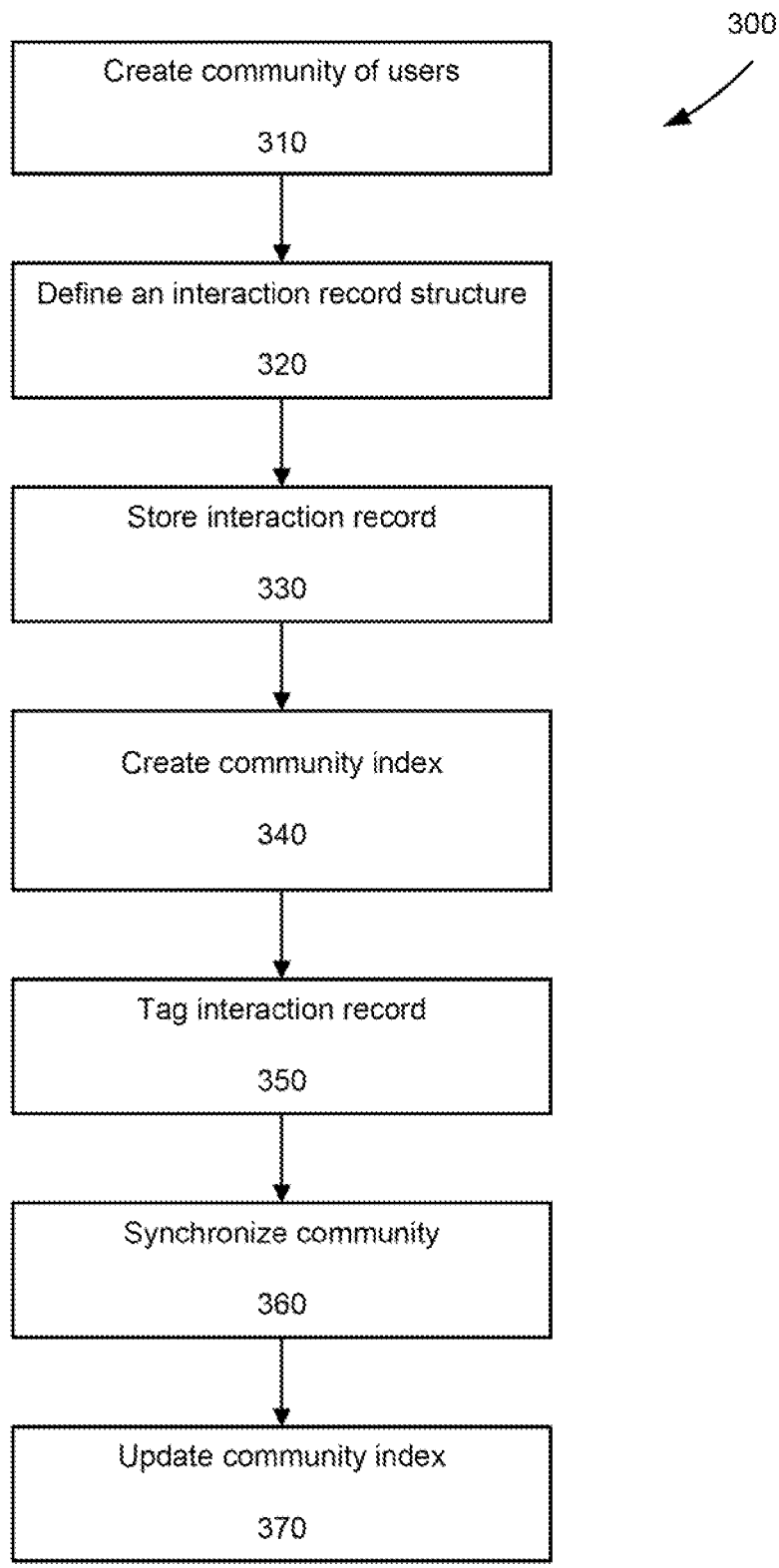
FIG. 3 illustrates a flow diagram outlining a method of managing an information network according to an embodiment of the present invention.

Referring to FIG. 3, there is illustrated a method of managing an information network by providing an interface between a social network and a content network. The illustrated method lends itself to implementation by a computer but need not be implemented by computer.

Method 300 may include the following operations: creating a community of users (operation 310); defining an interaction record structure (operation 320); storing an interaction record in the community of users based upon the interaction record structure (operation 330); creating a community index of the interaction record (operation 340); tagging the interaction record (operation 350); synchronizing the community of users based upon the community index by providing the stored interaction record to users such that the users have the same interaction record (operation 360); and updating the community index (operation 370). Various ones of these operations are respectively discussed in detail below.

In operation 310, a community of users may be created. To create this community, individual users may request membership into the community (operation 312) and those requests for membership maybe accepted or rejected based on criteria established by the community of users (operation 314).

The method 300 may additionally or alternatively include an operation 380 of displaying presence information. This presence information may, by way of non-limiting examples, characterize an individual user based on a community of users that the characterized individual user views or characterize an individual user in the community of users based upon the interaction record that the individual user is viewing.

In operation 340, a community index of the interaction record is created. This community index maybe characterized by a version number, especially when the synchronizing of operation 360 includes an operation 361 of acquiring the interaction record at the direction of a peer user based upon the version number of the community index. Here, the peer user may be a community keeper that locates a community user who has a current version of the community index.

Figure 5:
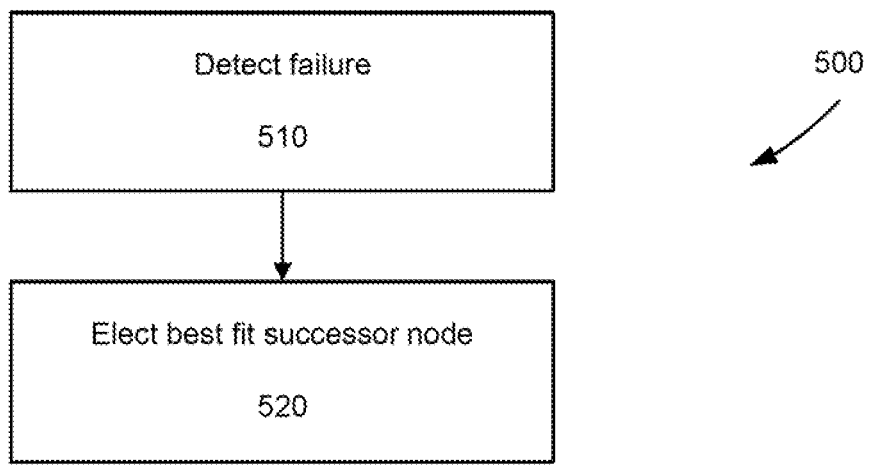
FIG. 5 illustrates operations of a keeper failover process according to an embodiment of the present invention.
Figure 6:
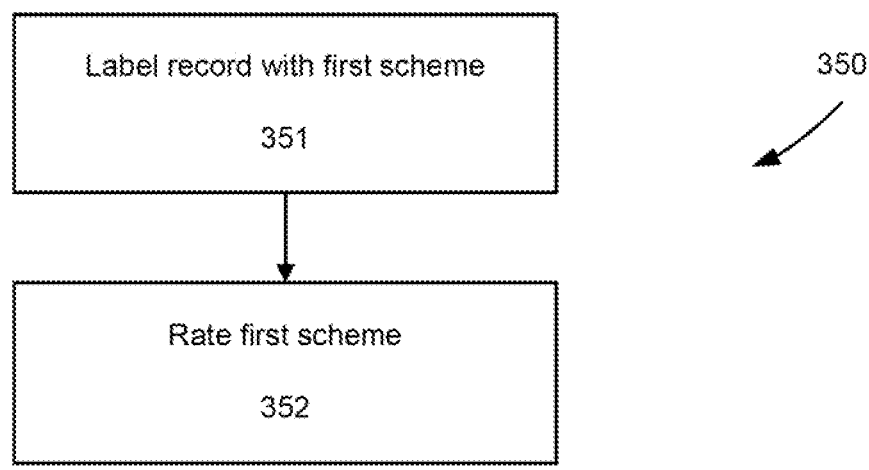
FIG. 6 illustrates operations of a tagging operation of the method of FIG. 3.
Figure 7:
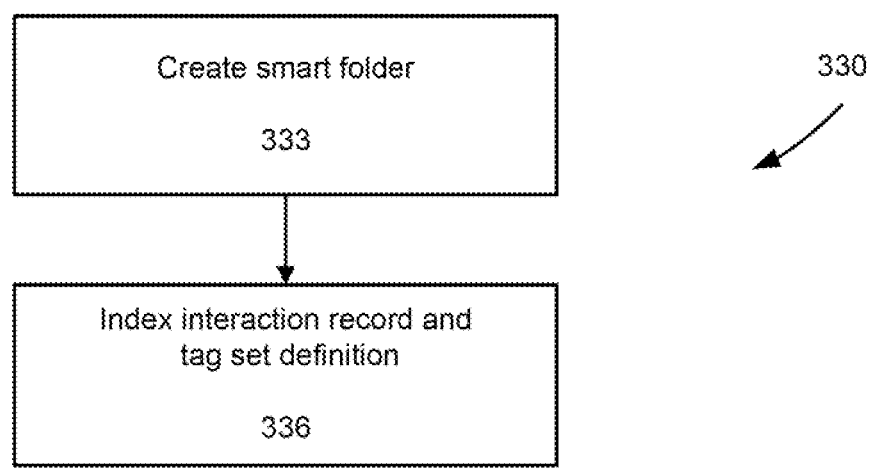
FIG. 7 illustrates operations of the storing of an interaction record of the method of FIG. 3.

This community keeper may be determined by a keeper failover process that, as FIG. 5 illustrates, includes: detecting failure of a user in the information network (operation 510); and electing a best-fit successor node to the failed user from a dynamic group of available users (operation 520). Here, the dynamic group of available users may include all active nodes in the information network. The best-fit successor node may assume the role of the community keeper and coordinates operations including community membership, presence, and content distribution.

The electing the best-fit successor node of operation 520 may include: delivering presence information and a community index to users in the information network (operation 521); receiving a keeper failure message (operation 522); validating that the community keeper is inaccessible and noting the community keeper position is vacant (operation 523); holding existing users within the information network and preventing additional users from accessing the information network until the best-fit successor node is elected (operation 524); broadcasting the keeper failure message to users in the information network (operation 525); halting current activity on the information network (operation 526); acknowledging the keeper failure message and providing a state of the acknowledging user, wherein the acknowledgment includes the acknowledging user's current index version, uptime statistics, and topology (operation 527); scoring the acknowledging users with a fitness heuristic to evaluate the users' and readiness to assume the role of keeper based on their reported state (operation 528); and selecting the best-fit successor node based upon the scores of the acknowledging users and sending a keeper handoff request to the selected best-fit successor node (operation 529).

Also, the selected best-fit successor node may send a keeper handoff accept message to the users on the information network and the identity of the best-fit successor node may be broadcast as the keeper.

This acquiring operation 361 may include, by way of non-limiting examples, retrieving the community index for a user joining the community of users or updating the community index for a user that previously joined the community of users.

Additionally or alternatively, the acquiring operation 361 may include: selecting the community user; sending a delivery request to the selected community user for the interaction record; comparing the delivery request to the community index of the selected community user; comparing the delivery request to the interaction record of the selected community user; and receiving the interaction record from the selected community user when the delivery request matches the community index of the selected community user and the delivery request matches the interaction record of the selected community user.

Additionally or alternatively, the acquiring operation 361 may include: synchronizing the community index including: selecting the community user; sending a delivery request to the selected community user for the current version of the community index; comparing the delivery request to the community index of the selected community user; and receiving the current version of the community index from the selected community user if the delivery request matches the community index of the selected community user. When the acquiring operation 361 includes these operations, the method 300 may also include synchronizing the interaction record (operation 390) by: sending a delivery request to the selected community user for a current version of the interaction record; comparing the delivery request to the version of the interaction record of the selected community user; and receiving the current version of the interaction record from the selected community user if the delivery request matches the interaction record of the selected community user.

Additionally or alternatively, the method 300 may also include: an operation 391 of rating the interaction record to establish a user-rated value of content in the interaction record; an operation 392 of rating the user within the community of users based upon an aggregate rating of interaction records that the user rated; and an operation 393 of weighing the user-rated value of content in the interaction record based upon the rating of the user within the community of users.

When the method 300 includes operation 393, the method 300 may additionally or alternatively include the following operations: performing a direct community rating, wherein an individual user rates the community of users in which the individual user participates (operation 394); determining a collective member score of the community of users, wherein the collective member score includes a sum of the ratings of the individual users in the community of users (operation 395); determining an average resource rating, wherein the average resource rating includes an average rating of interaction records within the community of users (operation 396); and rating the community of users based upon the direct community rating, the collective member score, and the average resource rating (operation 397).

Additionally or alternatively, the method 300 may also include the following operations: saving the interaction record with a local filename (operation 398); saving the interaction record as a source version record with a version number designation (operation 399); verifying the viability of the saved interaction record with the local filename (operation 388); and removing the source version record when the saved interaction record is viable, and overwriting the saved interaction record with the source version record when the saved interaction record is not viable (operation 389).

The tagging operation 350 may include the following operations: labeling the interaction record with a first classification scheme (operation 351); and rating the first classification scheme (operation 352). This first classification scheme may include a tag set definition. Also, when the tagging of operation 350 includes operations 351 and 352, the method 300 may additionally or alternatively include: an operation 353 of sending a message to a user based upon the label of the interaction record; labeling the interaction record with a second classification scheme, rating the second classification scheme, and determining a community classification scheme based upon the rating of the first classification scheme and the rating of the second classification scheme.

When operation 350 includes operations 351 and 352 and the first classification scheme includes a tag set definition, operation 350 may also include providing an inventory of tag set definitions from which a user may choose to classify the interaction record (operation 353). Further, the storing an interaction record in the community of users of operation 330 may then include: creating a smart folder (operation 333), wherein the smart folder houses the interaction record with at least one tag set definition; and indexing the interaction record and the tag set definition (operation 336). This interaction record may, by way of a non-limiting example, conform to a predetermined tag set definition to impose structure upon the interaction record before it is added to the community.

Figure 4:
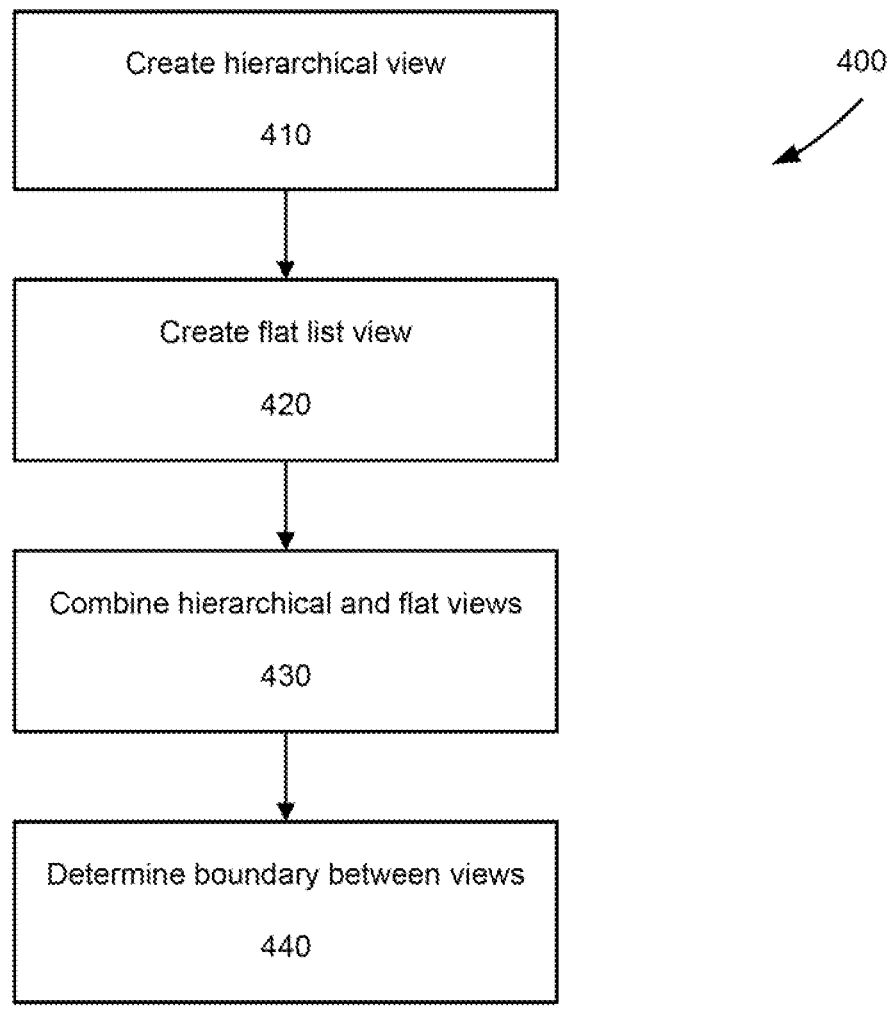
FIG. 4 illustrates operations of a method of evaluating tabular data according to an embodiment of the present invention.

Referring now to FIG. 4, there are illustrated operations of a method 400 of evaluating tabular data in an information network. The illustrated method lends itself to implementation by a computer but need not be implemented by a computer. The method may include the following operations: creating a hierarchical view of the tabular data (operation 410); creating a flat list view of the tabular data (operation 420); combining the hierarchical view of the tabular data and the flat list view of the tabular data to create a resource grid (operation 430); and determining on-demand at run time a boundary between the hierarchical view of the tabular data and the flat list view of the tabular data (operation 440).

Additionally or alternatively, the method 400 may also include an operation 450 of displaying variable column widths of the hierarchical view with a hierarchical tree viewer. When operation 450 is included, the tabular data may include at least one tag index characterizing the tabular data and/or the method 400 may include an operation 460 of filtering the at least one tag index to traverse the resource grid to locate a data record from within the combined hierarchical view and the flat list view.

The devices and subsystems of the exemplary embodiments of FIGS. 1-7 are for exemplary purposes, as many variations of the specific hardware used to implement the exemplary embodiments are possible, as will be appreciated by those skilled in the relevant arts. For example, the functionality of one or more of the devices and subsystems of the exemplary embodiments of FIGS. 1-7 can be implemented via one or more programmed computer systems or devices.

To implement such variations as well as other variations, a single computer system can be programmed to perform the special purpose functions of one or more of the devices and subsystems of the exemplary embodiments of FIGS. 1-7. On the other hand, two or more programmed computer systems or devices can be substituted for any one of the devices and subsystems of the exemplary embodiments of FIGS. 1-7. Accordingly, principles and advantages of distributed processing, such as redundancy, replication, and the like, also can be implemented, as desired, to increase the robustness and performance of the devices and subsystems of the exemplary embodiments of FIGS. 1-7.

The devices and subsystems of the exemplary embodiments of FIGS. 1-7 can store information relating to various processes described herein. This information can be stored in one or more memories, such as a hard disk, optical disk, magneto-optical disk, RAM, and the like, of the devices and subsystems of the exemplary embodiments of FIGS. 1-7. One or more databases of the devices and subsystems of the exemplary embodiments of FIGS. 1-7 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-7 can include appropriate data structures for storing data collected and/or generated by the processes of the devices and subsystems of the exemplary embodiments of FIGS. 1-7 in one or more databases thereof.

All or a portion of the devices and subsystems of the exemplary embodiments of FIGS. 1-7 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments of FIGS. 1-7 can be implemented on the World Wide Web. In addition, the devices and subsystems of the exemplary embodiments of FIGS. 1-7 can be implemented by the preparation of application-specific integrated circuits or by interconnecting an appropriate network of conventional component circuits, as will be appreciated by those skilled in the electrical arts. Thus, the exemplary embodiments are not limited to any specific combination of hardware circuitry and/or software.

As stated above, the devices and subsystems of the exemplary embodiments of FIGS. 1-7 can include computer readable media or memories for holding instructions programmed according to the teachings of the present invention and for holding data structures, tables, records, and/or other data described herein. Computer readable media can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present inventions have been described in connection with a number of exemplary embodiments and implementations, the present invention is not so limited, but rather covers various modifications, and equivalent arrangements, which fall within the purview of the prospective claims and their equivalents.

What is claimed is:

1. An article of manufacture comprising a non-transitory computer-readable data storage medium including computer-readable instructions stored thereon for causing a processor to perform a method of managing an information network by providing an interface between a social network and a content network, the method comprising:
    creating a community of users across network devices;
    defining an interaction record structure including a tagged grid;
    storing an interaction record of content in the community of users based upon the interaction record structure;
    creating a community index of content of the interaction record;
    tagging the interaction record with a user-generated description of content;
    synchronizing the community of users based upon the community index by providing an updated content component in the stored interaction record to users such that the users have the same interaction record; and
    updating the community index of the interaction record.

2. The non-transitory computer readable data storage medium article of manufacture of claim 1, wherein the method further comprises:
    requesting, by individual users, membership in the community of users;
    accepting or rejecting requests for membership based on criteria established by the community of users.

3. The non-transitory computer readable data storage medium article of manufacture of claim 1, wherein the method further comprises:
    displaying presence information characterizing an individual user based on a community of users that the characterized individual user views.

4. The non-transitory computer readable data storage medium article of manufacture of claim 1, wherein the method further comprises:
    displaying presence information characterizing an individual user in the community of users based upon the interaction record that the individual user is viewing.

5. The non-transitory computer readable data storage medium article of manufacture of claim 1, wherein the community index is characterized by a version number, and wherein the synchronizing of the community of users includes acquiring the interaction record at the direction of a peer user based upon the version number of the community index.

6. The non-transitory computer readable data storage medium article of manufacture of claim 5, wherein acquiring the interaction record includes retrieving the community index for a user joining the community of users.

7. The non-transitory computer readable data storage medium article of manufacture of claim 5, wherein acquiring the interaction record includes updating the community index for a user that previously joined the community of users.

8. The non-transitory computer readable data storage medium article of manufacture of claim 5, wherein the peer user is a community keeper that locates a community user who has a current version of the community index.

9. The non-transitory computer readable data storage medium article of manufacture of claim 8, wherein acquiring the interaction record includes:
    selecting the community user;
    sending a delivery request to the selected community user for the interaction record;
    comparing the delivery request to the community index of the selected community;
    comparing the delivery request to the interaction record of the selected community user; and
    receiving the interaction record from the selected community user when the delivery request matches the community index of the selected community user and the delivery request matches the interaction record of the selected community user.

10. The non-transitory computer readable data storage medium article of manufacture of claim 8, wherein acquiring the interaction record includes:
    synchronizing the community index including:
        selecting the community user;
        sending a delivery request to the selected community user for the current version of the community index;
        comparing the delivery request to the community index of the selected community user; and
        receiving the current version of the community index from the selected community user if the delivery request matches the community index of the selected community user.

11. The non-transitory computer readable data storage medium article of manufacture of claim 10, wherein the method further comprises:
    synchronizing the interaction record including:
        sending a delivery request to the selected community user for a current version of the interaction record;
        comparing the delivery request to the version of the interaction record of the selected community user;
        receiving the current version of the interaction record from the selected community user when the delivery request matches the interaction record of the selected community user.

12. The non-transitory computer readable data storage medium article of manufacture of claim 1, wherein the method further comprises:
    saving the interaction record with a local filename;
    saving the interaction record as a source version record with a version number designation;
    verifying the viability of the saved interaction record with the local filename; and
    removing the source version record when the saved interaction record is viable, and overwriting the saved interaction record with the source version record when the saved interaction record is not viable.

13. The non-transitory computer readable data storage medium article of manufacture of claim 1, wherein tagging the interaction record with user-generated descriptions of content includes:

labeling the interaction record with a first classification scheme; and rating the first classification scheme.

14. The non-transitory computer readable data storage medium article of manufacture of claim 13, wherein the first classification scheme includes a tag set definition.

15. The non-transitory computer readable data storage medium article of manufacture of claim 13, wherein the method further comprises:

sending a message to a user based upon the first classification scheme of the interaction record.

16. The non-transitory computer readable data storage medium article of manufacture of claim 13, wherein the method further comprises:

labeling the interaction record with a second classification scheme;

rating the second classification scheme; and determining a community classification scheme based upon the rating of the first classification scheme and the rating of the second classification scheme.

17. The non-transitory computer readable data storage medium article of manufacture of claim 15, wherein the method further comprises:

providing an inventory of tag set definitions from which a user may choose to classify the interaction record.

18. The non-transitory computer readable data storage medium article of manufacture of claim 17, wherein storing an interaction record in the community of users includes:

creating a smart folder, wherein the smart folder houses the interaction record with at least one tag set definition; and indexing the interaction record and the tag set definition.

19. The non-transitory computer readable data storage medium article of manufacture of claim 18, wherein the interaction record to be housed in the smart folder conforms to a predetermined tag set definition to impose structure upon the interaction record before it is added to the community.

20. The non-transitory computer readable data storage medium article of manufacture of claim 1, wherein the method further comprises:

rating the interaction record to establish a user-rated value of content in the interaction record.

21. The non-transitory computer readable data storage medium article of manufacture of claim 20, wherein the method further comprises:

rating the user within the community of users based upon a quality indication of the user's contributions to the community of users.

22. The non-transitory computer readable data storage medium article of manufacture of claim 21, wherein the method further comprises:

weighing the user-rated value of content in the interaction record based upon the rating of the user within the community of users.

23. The non-transitory computer readable data storage medium article of manufacture of claim 22, wherein the method further comprises:

performing a direct community rating, wherein an individual user rates the community of users in which the individual user participates;

determining a collective member score of the community of users, wherein the collective member score includes a sum of the ratings of the individual users in the community of users;

determining an average resource rating, wherein the average resource rating includes an average rating of interaction records within the community of users; and rating the community of users based upon the direct community rating, the collective member score, and the average resource rating.

24. The non-transitory computer readable data storage medium article of manufacture of claim 8, wherein the community keeper is determined by a keeper failover process, the keeper failover process comprising:

detecting failure of a user in the information network; and electing a best-fit successor node to the failed user from a dynamic group of available users, wherein the dynamic group of available users includes all active nodes in the information network, wherein the best-fit successor node assumes the role of the community keeper and coordinates operations including community membership, presence, and content distribution.

25. The non-transitory computer readable data storage medium article of manufacture of claim 24, wherein electing the best-fit successor node includes:

delivering presence information and a community index to users in the information network;

receiving a keeper failure message;

validating that the community keeper is inaccessible;

noting the community keeper position is vacant;

holding existing users within the information network and preventing additional users from accessing the information network until the best-fit successor node is elected;

broadcasting the keeper failure message to users in the information network;

halting current activity on the information network;

acknowledging the keeper failure message and providing a state of the acknowledging user, wherein the acknowledgment includes the acknowledging user's current index version, uptime statistics, and topology;

scoring the acknowledging users with a fitness heuristic to evaluate the users' readiness to assume the role of keeper based on their reported state;

selecting the best-fit successor node based upon the scores of the acknowledging users; and sending a keeper handoff request to the selected best-fit successor node.

26. The non-transitory computer readable data storage medium article of manufacture of claim 25, wherein the selected best-fit successor node sends a keeper handoff accept message to the users on the information network.

27. The non-transitory computer readable data storage medium article of manufacture of claim 26, wherein the method further comprises:

broadcasting the identity of the best-fit successor node as the keeper.

28. A system for managing an information network by providing an interface between a social network and a content network, the system comprising:

a community keeper configured to maintain a community index table and coordinate operations of a created community of users across network devices;

a resource grid configured to define an interaction record structure including a tagged grid;

wherein the community keeper is further configured to store an interaction record of content in the community of users based upon the interaction record structure and to create a community index of content of the interaction record;

wherein the resource grid is further configured to tag the interaction record with a user generated description of content; and a content synchronization module configured to synchronize the community of users based upon the community index by providing an updated content component in the stored interaction record to users such that the users have the same interaction record and wherein the content synchronization module is further configured to update the community index of the interaction record.

29. The system of claim 28, wherein the content synchronization module is further configured to:
determine which versions exist for a piece of content; and
determine a latest version for the piece of content.

30. The system of claim 29 further comprising a keeper failover module configured to dynamically manage an index for each community of users and to establish a community keeper that possesses the latest version for each piece of content.

31. The system of claim 28 further comprising:
a content management module configured to receive indexing standards created by the community of users and further configured to manage content within the community of users based upon the indexing standards.

32. The system of claim 31 further comprising:
a user rating and content rating module configured to receive content ratings from the community of users, evaluate the content ratings based upon a user-created rating criterion, and establish a value of the content based upon the user ratings.

33. The system of claim 31 further comprising:
a user rating and content rating module configured to receive content ratings from the community of users, evaluate user behavior in the community of users, and establish a value of the content based upon the user behavior in the community of users.

* * * * *